Aug. 22, 1950

M. H. SUSSIN 2,519,609

PHOTOENGRAVING LAMP CARRIER

Filed Sept. 30, 1946

Inventor
Max H. Sussin
By Louis Robertson Attorney

Aug. 22, 1950 M. H. SUSSIN 2,519,609
PHOTOENGRAVING LAMP CARRIER
Filed Sept. 30, 1946 2 Sheets-Sheet 2
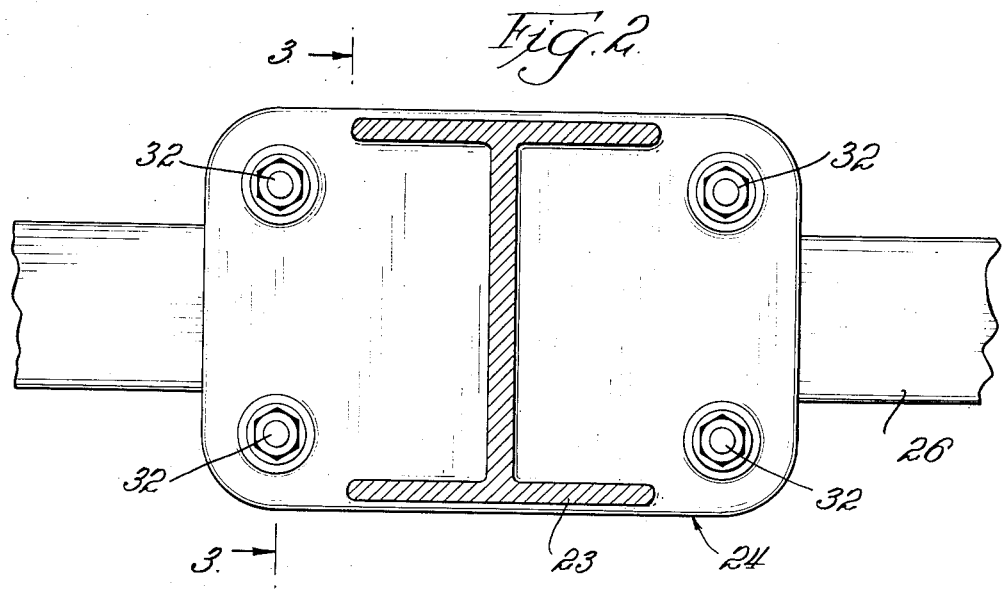
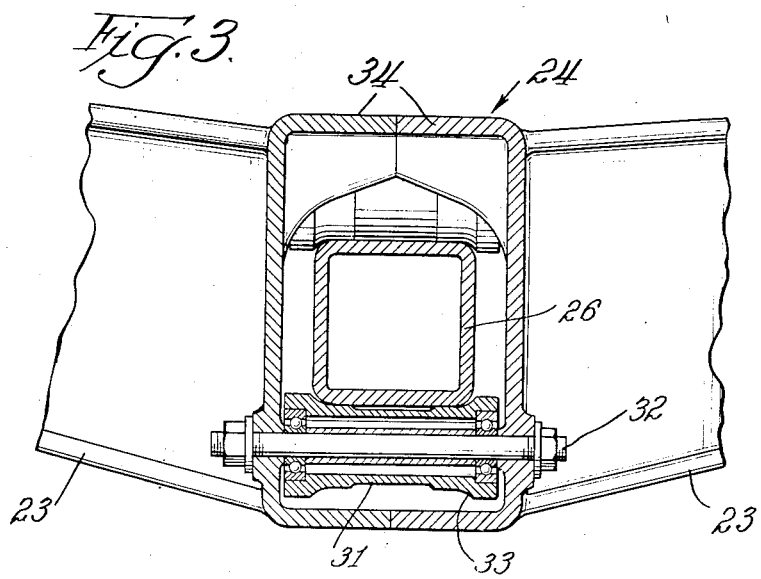
INVENTOR.
Max H. Sussin
BY
Louis Robertson Att'y.

Patented Aug. 22, 1950

2,519,609

UNITED STATES PATENT OFFICE 2,519,609

PHOTOENGRAVING LAMP CARRIER

Max H. Sussin, Chicago, Ill., assignor to Benjamin Sugarman, Chicago, Ill.

Application September 30, 1946, Serial No. 700,292

4 Claims. (Cl. 88—24)

In photo-process cameras for photo-engraving, lithography, and other photo-mechanical reproduction, the copy holder is conventionally mounted on a horizontally disposed bed or frame to move toward and from the camera lens. Likewise, the camera lens is movable toward and from the copy holder. Both of these movements are necessary in order to focus the camera while providing varying degrees of reduction in the size of the copy.

It is also common practice to provide an arc lamp on either side of the camera bed to illuminate the copy. These arc lamps must be movably mounted so that they may be properly disposed for varying positions of the copy holder. Furthermore, when the matter to be copied is a transparency, such as a color film or a negative, the arc lamp must be positioned on the further side of the copy holder, whereas when the copy is not a transparency the arc lamp must be positioned on the side of the copy holder facing the lens.

According to the present invention, an improved lamp mounting has been provided which is extremely simple, and which, nevertheless, permits the lamps to be moved without shaking or distorting the camera bed, and causing minute imperfections in the focus of the camera. This is accomplished by making the camera bed of a rigid frame type of construction, and supporting the lamps with an inexpensive, relatively independent structure which permits the lamps to be moved very smoothly and easily. This has been accomplished by providing a simple mono-rail extending below the frame of the bed along the center line of the apparatus and suspending the lamp carriage from the mono-rail, the suspension being through rollers, which both support and align the carriage for easy movement on the rail. In addition, the suspending means or carriage includes on each side a pivoted pair of arms, one of which bears the lamp, and the other of which is pivoted to the main body of the carriage. Thus each lamp may be positioned independently of the other, and both may assume a wide variety of positions with respect to the copy holder without moving the carriage. Once they are properly positioned with respect to the copy holder, the carriage and copy holder may be moved together without changing the relative positions of the lamps and the copy holder. In view of the fact that the lamp carriage is carried by a relatively independent rail, it may be connected to the copy holder by a loose link so that it will move as the copy holder is moved.

Additional objects and advantages of the invention will be apparent from the following description, and from the drawings, in which:

Figure 2 is a sectional view showing the side of the main carriage body on the mono-rail; and, Figure 3 is a fragmentary sectional view, approximately on the broken line 3—3 of Figure 2, showing details of the mounting of the carriage.

Figure 1:
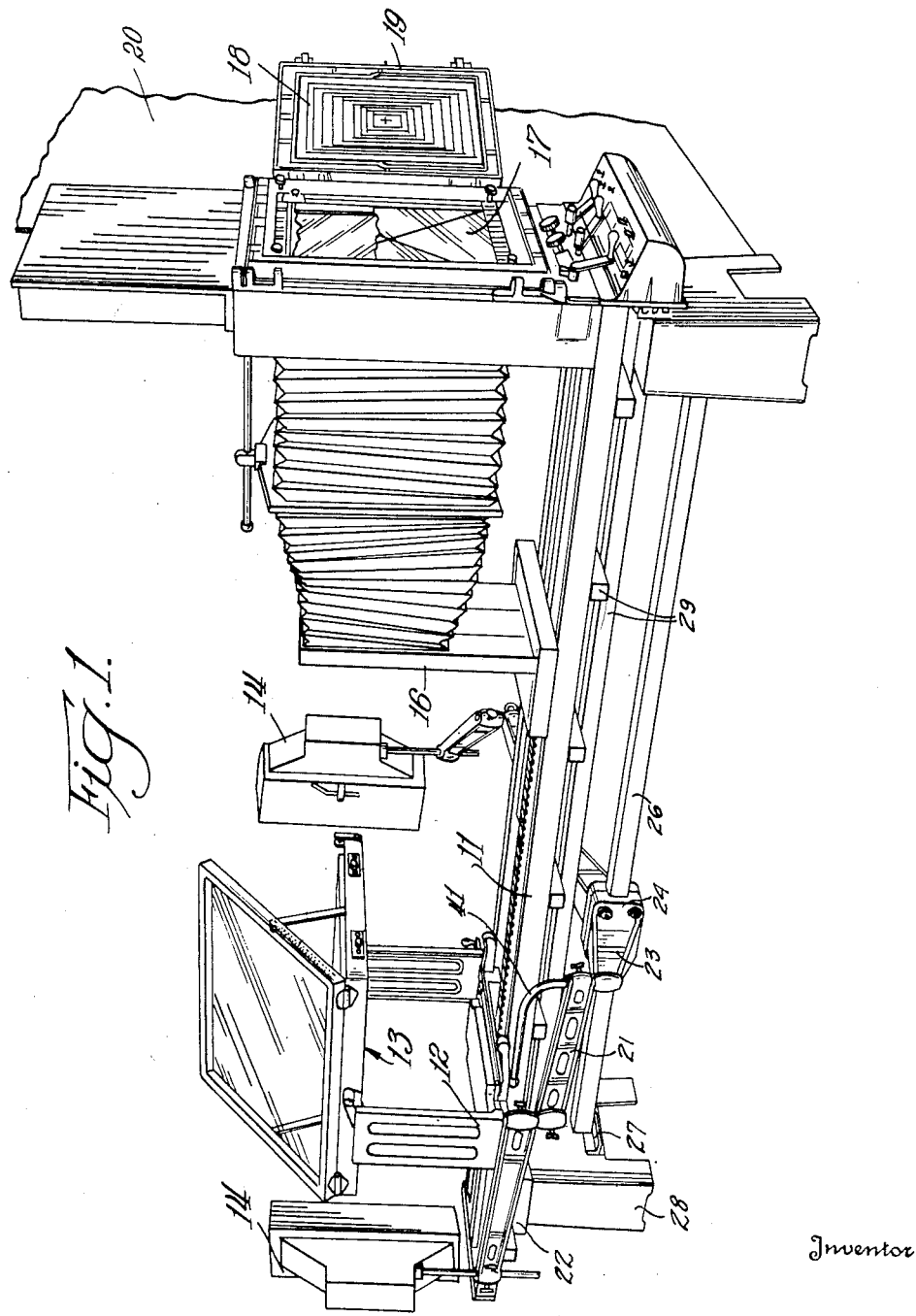
Figure 1 is a perspective view of a photo-engraving camera embodying this invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

*General description of camera*

The invention has been illustrated in conjunction with a photo-engraving camera of the dark room type. A camera bed 11 is provided with a copy holder carriage 12 on which a copy holder 13 is mounted. The films are illuminated by lamps 14, and are filmed through a lens carried on a lens board 16 movable on the bed 11. The lens of lens board 16 focuses an image of the copy either on ground glass 17 or on a film carried by a film holder 18, but which during exposure of the pictures is swung to the position of the ground glass 17 in Figure 1. The film holder 18 and the ground glass 17 are preferably located within a dark room built to receive the film end of the camera, an opaque flexible curtain 20 bridging between the film end of the camera and the walls of the dark room to shut off all light from the outside.

The present invention relates particularly to the mounting of lamps 14.

It is important that these lamps be movable freely without distorting or shaking the camera bed, or the parts carried thereby. Preferably the lamps are linked to the carriage 13 to move therewith. The lamps must, therefore, move extremely easily.

According to the present invention, each lamp 14 is carried by a pair of folding arms 21 and 22, which are carried by outstanding arms 23 on a mono-rail carriage 24. The mono-rail carriage moves easily on a mono-rail 26. The mono-rail 26 preferably rests on flanges 27 of camera pedestals 28, being bolted thereto.

It should be observed that the entire bed construction of the camera, including pedestals 28, bed 11, and underframe work 29, forms a rigid structure independently of the mono-rail 26. The mono-rail 26 is incapable of distorting the main camera structure due to shifting the weights of the lamps and their supporting structure with respect to the mono-rail 26. This partly results from the central position of the mono-rail on the standard 28, but results mainly from the fact that the mono-rail is supported directly from the pedestals, which are thoroughly rigid within themselves, and are rigidly associated together independently of the mono-rail 26.

Ease of movement of the carriage 24 on the mono-rail 26 is preferably assured by rollers 31 having rolling types of bearings, such as those illustrated in Figure 3. There are four of these rollers, one above, and one below the mono-rail near each end of the carriage 24, supported by the four rods 32 seen in Figure 2. Ideally, the mono-rail 26 would engage the radius portion 33 of the roller 31, so that the carriage is prevented from twisting in any direction. However, a slight departure from this ideal condition is commercially necessary, and the mono-rail usually lies just inside of the radii. A very slight twist will merely bring a radius into engagement with the mono-rail, and prevent further twist, without causing any jamming action.

The carriage 24 is preferably linked to the copy carriage 12 by a link bar 41. This link bar is preferably loosely connected to both of the carriages to minimize the possibility of applying any canting force to the carriage by the lamp carriage 24. The rods 32 serve not only as supports for roller 31, but also as tie rods for holding together the two halves 34 of the carriage 24.

From the foregoing it is seen that a photoengraving camera is provided in which the lamps are carried by the camera structure by an independent mono-rail thereon, which prevents distortion of the camera bed as the lamps are shifted. The lamps are carried by a carriage, which runs so freely on the mono-rail that it may, without detriment, be linked to the copy holder carriage to move therewith.

I claim:

1. A photo-process camera including a frame-like bed rigid within itself, a copy holder movably carried by the bed, a mono-rail supported below the bed and being substantially free therefrom, except for common standards, a carriage rollable on the mono-rail and supported thereby, a pair of pivotable arms pivotably carried by each end of the carriage, a lamp holder carried by the free arm of each pair, and loose-link means connecting the copy holder to the carriage for movement of the carriage on its mono-rail as the copy holder is moved on its bed.

2. A photo-process camera including a frame-like bed rigid within itself, a copy holder movably carried by the bed, a mono-rail supported below the bed and being substantially free therefrom, except for common standards, a carriage rollable on the mono-rail and supported thereby, lamp means carried by the carriage, and loose-link means connecting the copy holder to the carriage for movement of the carriage on its mono-rail as the copy holder is moved on its bed.

3. A photo-process camera including a frame-like bed rigid within itself, a copy holder movably carried by the bed, beam means supported below the bed and being substantially free therefrom, except for common standards, a carriage rollable on the beam means and supported thereby, a lamp holder adjustably carried by the carriage, and loose-link means connecting the copy holder to the carriage for movement of the carriage on its mono-rail as the copy holder is moved on its bed.

4. A photo-process camera including a frame-like bed in the form of a beam, rigid standards supporting the bed at opposite ends, a copy holder movably carried by the bed for horizontal movement between the two ends, a generally horizontal mono-rail in the form of a beam of non-circular cross section carried at its ends by the standards and self-supporting therebetween, a carriage movably supported by the mono-rail and including rollers mounted with rolling bearings adapted to engage the mono-rail, the rollers at each end of the carriage lengthwise of the mono-rail being adapted to engage non-circular portions of the mono-rail with pressure vertically in both directions and laterally in both directions to substantially prevent all movement of the carriage except longitudinally along the rail, lamp-supporting means carried by the carriage and movable with respect thereto, and loose-link means connecting the copy holder to the carriage for movement of the carriage on its mono-rail by the copy holder as the copy holder moves on its bed.

MAX H. SUSSIN.

REFERENCES CITED

The following references are of record in the file of this patent:

UNITED STATES PATENTS

| Number | Name | Date |
|---|---|---|
| 2,107,074 | Hineline | Feb. 1, 1938 |
| 2,150,542 | Cook | Mar. 14, 1939 |
| 2,235,355 | Brown | Mar. 18, 1941 |
| 2,314,033 | Curran | Mar. 16, 1943 |
| 2,345,393 | Heyermans | Mar. 28, 1944 |
| 2,376,416 | Campbell | May 22, 1945 |

FOREIGN PATENTS

| Number | Country | Date |
|---|---|---|
| 507,265 | Germany | Oct. 31, 1930 |
| 517,896 | Great Britain | Feb. 12, 1940 |